United States Patent
Epars et al.

(10) Patent No.: US 10,065,787 B2
(45) Date of Patent: Sep. 4, 2018

(54) METHOD AND SYSTEM FOR DETERMINING REPLENISHMENT INFORMATION

(71) Applicant: Nestec S.A., Vevey (CH)

(72) Inventors: Yann Epars, Penthalaz (CH); Mark Shepherd, La Croix sur Lutry (CH); Florian Jacquier, Morristown, NJ (US); Daniel Roland Manser, Spiez (CH)

(73) Assignee: Nestec S.A., Vevey (CH)

( * ) Notice: Subject to any disclaimer, the term of this patent is extended or adjusted under 35 U.S.C. 154(b) by 3 days.

(21) Appl. No.: 14/895,367

(22) PCT Filed: Jun. 4, 2014

(86) PCT No.: PCT/EP2014/061566
§ 371 (c)(1),
(2) Date: Dec. 2, 2015

(87) PCT Pub. No.: WO2014/195351
PCT Pub. Date: Dec. 11, 2014

(65) Prior Publication Data
US 2016/0130068 A1 May 12, 2016

(30) Foreign Application Priority Data
Jun. 7, 2013 (EP) .................................... 13171085

(51) Int. Cl.
*B65D 83/00* (2006.01)
*A47J 31/52* (2006.01)
(Continued)

(52) U.S. Cl.
CPC .............. *B65D 83/00* (2013.01); *A23L 33/40* (2016.08); *A47J 31/407* (2013.01); *A47J 31/52* (2013.01);
(Continued)

(58) Field of Classification Search
None
See application file for complete search history.

(56) References Cited

U.S. PATENT DOCUMENTS 7,793,797 B2 * 9/2010 Jarisch ................ A47J 31/3642
221/104
8,989,895 B2 * 3/2015 Holman .............. G07F 17/0064
700/233
(Continued)

FOREIGN PATENT DOCUMENTS

| WO | 200223735 A2 | 3/2002 |
|----|---|---|
| WO | 2006090183 A2 | 8/2006 |

(Continued)

OTHER PUBLICATIONS

International Search Report, dated Aug. 11, 2014, in PCT/EP2014/061566, filed Jun. 4, 2014.
(Continued)

*Primary Examiner* — Gene O Crawford
*Assistant Examiner* — Stephen L Akridge
(74) *Attorney, Agent, or Firm* — Dunlap Coddling, P.C.

(57) ABSTRACT

A system and method for determining replenishment information for capsules as replenishment for a beverage production machine are provided.

5 Claims, 13 Drawing Sheets

(51) Int. Cl.
*G07F 9/02* (2006.01)
*A47J 31/40* (2006.01)
*A23L 33/00* (2016.01)
*G07F 13/10* (2006.01)
*A47J 31/44* (2006.01)

(52) U.S. Cl.
CPC .............. *G07F 9/026* (2013.01); *G07F 13/10* (2013.01); *A23V 2002/00* (2013.01); *A47J 31/4492* (2013.01); *B65D 2583/005* (2013.01)

(56) References Cited

U.S. PATENT DOCUMENTS

| | | | |
|---|---|---|---|
| 2005/0048461 A1* | 3/2005 | Lahteenmaki | A61J 3/002 435/3 |
| 2005/0193901 A1* | 9/2005 | Buehler | A47J 44/00 99/468 |
| 2009/0293733 A1* | 12/2009 | Martin | A47J 31/60 99/280 |
| 2010/0300299 A1* | 12/2010 | Epars | A47J 31/3623 99/288 |
| 2011/0195144 A1* | 8/2011 | Haschke | A23L 1/296 426/2 |
| 2011/0262601 A1* | 10/2011 | Manser | A23L 1/296 426/231 |
| 2012/0245732 A1* | 9/2012 | Yoakim | G07F 9/026 700/244 |
| 2013/0036815 A1* | 2/2013 | Bernhardsgruetter | A47J 31/4457 73/290 V |
| 2013/0054257 A1* | 2/2013 | Holman | G07F 17/0064 705/2 |
| 2014/0076170 A1* | 3/2014 | Epars | A47J 31/06 99/295 |

FOREIGN PATENT DOCUMENTS

| | | | | |
|---|---|---|---|---|
| WO | 2009032942 A2 | | 3/2009 | |
| WO | WO-2010003878 A1 | * | 1/2010 | ............. A23L 1/296 |
| WO | 2011067232 A1 | | 6/2011 | |
| WO | WO-2012062842 A1 | * | 5/2012 | ............. A47J 31/369 |
| WO | WO-2012104173 A1 | * | 8/2012 | ........... A47J 31/0668 |

OTHER PUBLICATIONS

Written Opinion of the International Searching Authority, dated Aug. 11, 2014, in PCT/EP2014/061566, filed Jun. 4, 2014.

* cited by examiner

METHOD AND SYSTEM FOR DETERMINING REPLENISHMENT INFORMATION

CROSS REFERENCE TO RELATED APPLICATIONS/INCORPORATION BY REFERENCE STATEMENT

This application is a US national stage application filed under 35 USC § 371 of International Application No. PCT/EP2014/061566, filed Jun. 4, 2014; which claims priority to Application No. EP 13171085.7, filed Jun. 7, 2013. The entire contents of the above-referenced application are hereby expressly incorporated herein by reference.

BACKGROUND

The presently disclosed and/or claimed inventive concept(s) is directed to a method and a system for determining replenishment information for capsules as replenishment for a beverage production machine.

Recently it became more and more popular to prepare beverages like infant formula by use of production machines which make use of a capsule containing nutritional ingredients. By using capsules for containing nutritional ingredients it is possible to have a wide variety of different capsules in stock, thus, enabling a consumer to decide which beverages to be produced each time a capsule is inserted into the beverage production machine.

A beverage production machine and the corresponding capsule are known from WO2012/062842. The known system makes use of information which is provided on the capsule in order to determine a type of capsule which is used by the beverage production machine. Thus, production parameters which need to be adapted for preparing a beverage from a particular capsule can be set by the beverage production machine. Such parameters may for example be the amount of liquid which needs to be used for the inserted capsule but also the temperature or flow rate for example. As a result, an individualized production of a beverage from a particular type of capsule can be provided. While such system ensures best preparation of the final product the type of capsule which has to be used has to be selected by the consumer himself. When preparing a nutritional product for babies for example the selection of a particular type of capsule to be used may not simply be decided by the user of the machine due to his personal taste but is subject to boundaries such as the age of the baby and/or a balanced diet. The known machine does not provide any assistance with respect to the selection of the particular capsule. This is particularly important in case that new capsules are needed. The new capsules may differ from the used ones regarding their nutritional ingredients, because they are dedicated for another age of the growing baby.

Thus, the presently disclosed and/or claimed inventive concept(s) provides a method and system for assisting selection of particular types of capsules when replenishment of capsules is needed.

BRIEF DESCRIPTION OF THE DRAWINGS

In the following the system and method are explained in greater detail with respect to certain non-limiting embodiments illustrated in the drawings.

FIG. 7 is a calendar showing a consumption of beverages.

FIGS. 11a and 11b are detailed views of a particular device constructed in accordance with the presently disclosed and/or claimed inventive concept(s).

FIG. 12 is an example for a mask for manual input of data.

DETAILED DESCRIPTION

Figure 1:
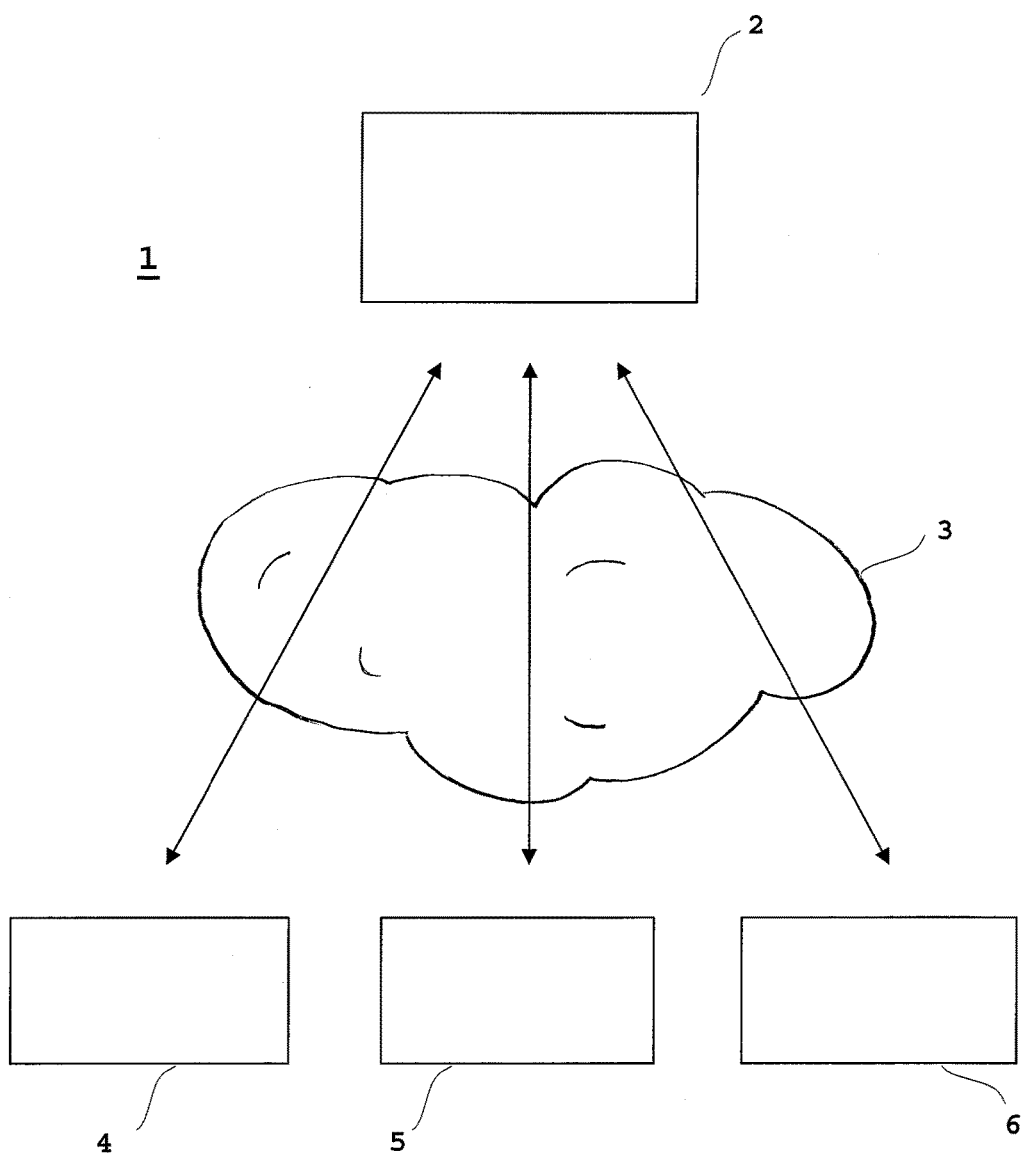
FIG. 1 is an overview over the entire structure of the system constructed in accordance with the presently disclosed and/or claimed inventive concept(s).

The problem is solved by the method and the system of the presently disclosed and/or claimed inventive concept(s) that is described herein. According to the inventive method replenishment information is determined not simply being an 1:1 replacement of used capsules. Thus, after having used capsules for preparing infant formula for feeding a baby the type of capsules as replenishment for further feeding the growing baby is determined. This determination is made on the basis of capsule information which is stored in a server. This capsule information in particular includes an identification of the type of the capsule associated with a recommended age of the baby.

On the same server furthermore a user account is stored. This user account includes personal information about the baby which is consuming the beverages produced from the capsules. When the baby is fed with an infant formula produced from a capsule the capsule used therefore is identified by the beverage production machine and the respective information is transmitted to the server. In the server now there is available the capsule information regarding the plurality of different types of capsules which are generally available and each of which is recommended for a particular age of the infant and on the other hand personal information about the baby is available as well as an information about the capsules which have already been used, i.e., identified as used in the machine. Consequently, when replenishment of capsules is necessary it is possible not only to substitute the used types of capsules but also to take into consideration the age of the baby as well as the recommendation for particular types of capsules recommended for this age. As a consequence, the type of capsules can be determined which is needed in the next step of the development of the baby in order to maintain a balanced diet.

"Types" of the capsules may not only be divided with respect to the recommended age of the baby but may also indicate different tastes and/or recipes of the infant formula. Thereby it is not only possible to provide replenishment which matches the current age of the infant but also assist a balanced diet by providing for example an equal distribution over a plurality of different tastes and/or recipes of the infant formula having different nutritional facts.

In certain non-limiting embodiments, the beverage production machine transmits information on the identified capsule each time a beverage is produced from said capsule. Automatically transmitting this information each time a beverage is produced keeps the data which is stored in the server up to date. In particular, the automatic transmission to the server ensures that no error can occur by the user who otherwise might forget to send the information to the server for example. As a result real time tracking of the consumption is also possible.

Advantageously, the server is hosted by the supplier of the capsules so that the information regarding the plurality of different types of capsules may always be kept up to date. In particular, new infant formulas might be offered by the supplier and due to the fact that the information is stored on the server any change may be taken into consideration immediately. This information is available for a plurality of user accounts. Each user account may be accessed by a consumer terminal of an account holder and is connected to the server via internet. The access is performed by logging in on a website and consequently the registered user account holder may access his account by any terminal which is available and capable of internet communication. Such terminals may for example be cell phones, tablet PCs, PCs, notebooks and the like. The advantage is that any information which is available from the user account may be accessed independently from the beverage production machine at anytime from anywhere.

In order to link the information of the identified used capsules to the baby the beverage production machine is registered and assigned to a user account in the server. The user account may furthermore have other devices registered which are also capable of transmitting information to the server. By doing so it is possible to link information which is related to the development of the baby and make it accessible by use of a single account. This increases the comfort and the possibility to share information for example with a pediatrician.

In particular, non-limiting embodiments, the beverage production machine and/or the other devices are capable of determining internal parameters. Information on these parameters which might be the value of the parameter itself is then transmitted to the server. Such a transmission might either be performed regularly after constant time intervals or upon recognition of values being higher or lower than a predetermined threshold. The parameters which may be monitored are for example low rate, temperature or the like. The information on these parameters is then stored in the user account and accessible by the user. The user can thus keep himself informed about the current status of his used devices and may for example take maintenance measures in due time. As an alternative to or in addition to the internal parameters external parameters may be determined and transmitted to the server. In a particular non-limiting embodiment, such external parameter is the weight of the baby, and the other device is a weight scale which is also capable of internet communication.

By accessing the user account the user may also receive an analysis on the stored internal parameters or measured and stored external parameters. Such an analysis may for example be a weight curve or statistics on used capsules. In that case the analysis is based on consumption data (consumption history) which is a result of the information regarding the type of capsule used which is transmitted each time a beverage is produced.

Although not particularly limited, in certain embodiments, the communication between the server and beverage production machine and/or other devices is performed by using WiFi. The devices (including the beverage production machine) have for example a WIFI-card with an exclusive MAC address for identification of the device/machine. In certain non-limiting embodiments, in order to allow a perfect management of the stock that information on purchasing capsules is also stored in the user account and that this information on the amount of capsules still available to the user is also used as a basis for determination of a demand for replenishment. Thus, in case that the remaining capsules fall short of a predetermined threshold a demand for replenishment is determined. This demand which is determined may result in an automatic order which is generated electronically out of the user account or in an information presented to the user either in the account which is accessed by the user or by sending a notification such as an e-mail invitation to perform an ordering process. Alternatively the demand may be determined on the basis of the number of used capsules instead of the number of remaining capsules.

For performing the method a system for determining replenishment information for capsules is used. This system comprises a beverage production machine, a remote server and means for determining at least one type of capsules used in the machine. The beverage production machine includes means for producing a beverage from a capsule and furthermore means for identifying a type of the capsule which is used for the current beverage production process. Furthermore, the beverage production machine comprises means for transmitting information to a remote server. In a particular, non-limiting embodiment, this is realized by a WiFi interface.

The remote server on the other hand comprises a storage means where the user account is stored. The user account includes individual information about the consuming person, i.e. the baby for which infant formula is produced by the beverage production machine. Furthermore, the remote server comprises storage means for storing capsule information for a plurality of different types of capsules. In certain non-limiting embodiments, this information includes an identification of a particular type of capsule plus a recommendation for an age at which the infant formula produced therefrom should preferably be consumed.

The means for determining at least one type of capsules for replenishment (the processor of the server) is furthermore configured to make such determination on the basis of the capsule information and information regarding the baby stored in the user account. Particularly, an information about the age of the baby which is available from the information stored in the user account plus the recommendation which is included in the information on the types of capsules are used in order to determine which capsules are suitable to be replenished when replenishment is necessary next time.

The system is furthermore configured such that user access is possible by a consumer terminal being connected to the server. Connection is, in certain non-limiting embodiments, performed using the internet. In order to provide a single access to the user thereby enabling control of all devices including the beverage production machine used by the user the beverage production machine and/or at least one other device comprise at least one sensor for determining an internal parameter. In certain non-limiting embodiments, all parameters which are relevant for the production of the beverage or the use of the other device are monitored within the beverage production machine or the other device and are transmitted to the server in order to monitor the current status of the machine and recognize or anticipate machine failure. Information received from the production machine and/or the at least one other device are then stored in the server. In order to add information to the user account, in certain non-limiting embodiments, the at least one other device is capable of measuring an external parameter such as a weight of the baby and transmit an information on or the result itself to the server.

The server on the other hand includes means that is capable to perform an analysis on the data that is delivered from the beverage production machine and/or the other device. The result of the analysis can then be accessed from the user account.

In FIG. 1 an overview over the entire system is given. The entire system 1 comprises a remote server 2 that is hosted by the manufacturer of the capsules. The server 2 is connected to the internet and is accessible via the internet from a remote location. Such a remote location is for example the home of a user who wants to use the services of the system. The personal apparatuses of the user may be connected to the server 2 via the internet 3. In the illustrated example such apparatuses are a beverage production machine 4, another device 5 and a user terminal 6. The other device 5 may for example be a weight scale for measuring the weight of a baby. The user terminal 6 can be any device that is capable of performing internet communication and in particular browsing a web side. All these apparatuses perform a communication via the internet by any known standard. In particular, the beverage production machine 4 and the other device 5 may perform a Wi-Fi communication with a router (not shown) that is installed in a home network and which is connected to the internet. The beverage production machine 4 and the other device 5 therefore are included in a home network. On the hand, the user terminal 6 may be integrated in the home network as well or may access the internet according to a mobile telecommunication standard. Of course, such mobile telecommunication standard might also be used by the beverage production machine 4 or the other device 5. But as such machines in most cases are not intended for mobile use integration into a home network only may be desired in certain non-limiting embodiments.

Figure 2:
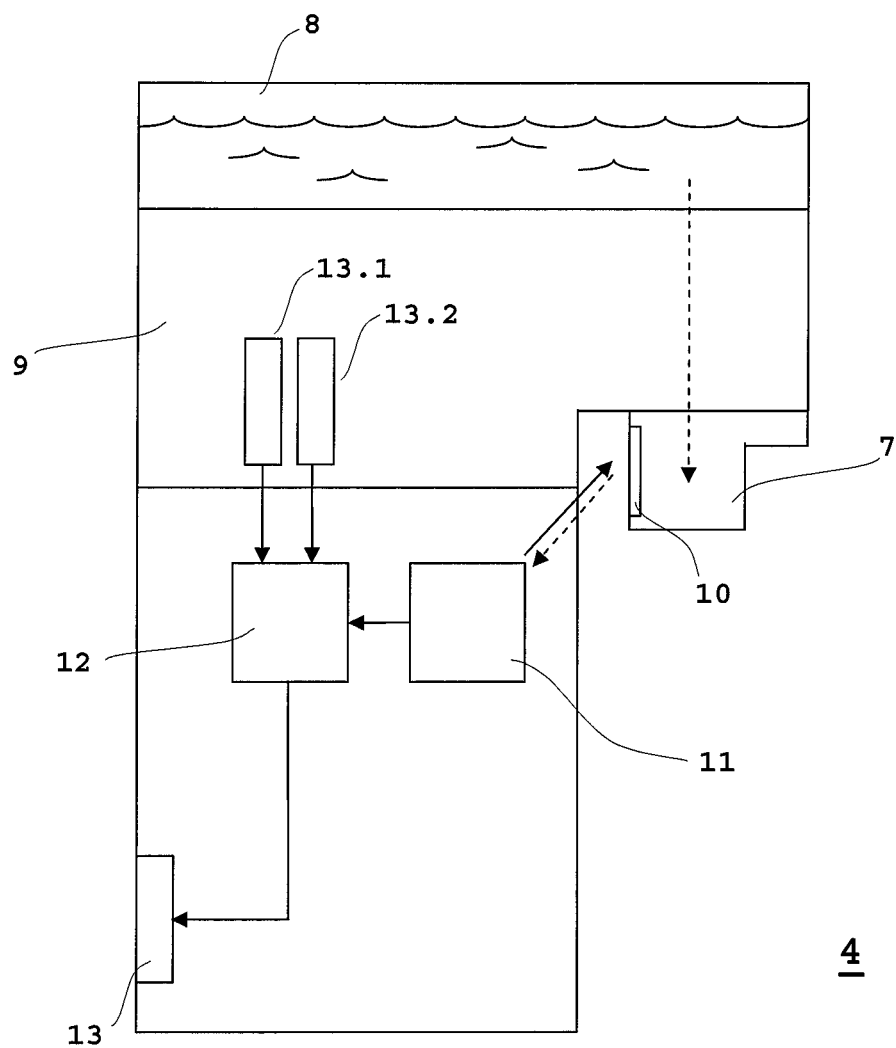
FIG. 2 is a block diagram of a beverage production machine for use in the system constructed in accordance with the presently disclosed and/or claimed inventive concept(s).

FIG. 2 shows the structure of the beverage production machine 4 in greater detail.

In order to produce an infant formula the beverage production machine 4 needs a capsule 7. In the capsule 7 there is contained a nutritional ingredient. The capsule 7 is inserted for example by means of a capsule holder into the beverage production machine 4. After the capsule 7 is inserted into the machine, the infant formula (being an example for a beverage) is produced by the machine. The beverage production machine 4 comprises a reservoir 8 in which a liquid is contained. Such liquid might be water, milk or the like. For further explanation it is assumed that the liquid is water that needs to be mixed with the nutritional ingredients in the capsule 7 in order to prepare the infant formula. Supplying the water to the nutritional ingredients of the capsule is achieved by means of a processing mechanism 9. The processing mechanism 9 is capable of heating the water to desired temperature, opening the capsule 7 and supplying the heated water to the capsule 7 with a defined flow rate. When the water is supplied to the capsule it will be mixed with the nutritional ingredients and the final product is then poured into a baby bottle or the like for example. For emptying the capsule an air pressure is applied by means of an air needle.

It is to be noted that different types of capsules 7 may be used in the same beverage production machine 4. These different types may have different tastes of the beverage to be produced and/or different amounts of the nutritional ingredients contained in the capsule 7 for example. Thus, the flow rate, the amount of water, the pressure and the temperature of the water need to be adjusted to the type of capsule 7 that is currently used.

In order to adjust the parameters for the production that are set by the processing mechanism 9 it is necessary to determine first what type of capsule 7 is currently inserted into the beverage production machine 4. The capsules 7 have information on the type provided on their surface which is in the illustrated embodiment a code, e.g., a barcode 10. The information on the barcode 10 is read by a barcode reader 11. To ensure that the barcode 10 can be read by the reader the capsule 7 is non-symmetric and thus, the barcode 10 which is located at a particular position on the capsule 7 is oriented always the same when the capsule 7 is inserted into the beverage production machine 4. The information of the type of capsule 7 that is used for the current preparation of a beverage is transmitted by the barcode reader 10 to a processing unit 12 which is connected to an internet unit 13. The internet unit may for example be a WI-FI module which is able to communicate with a router that is connected to a home network. Within the processing unit 12 the information received from the barcode reader 11 may either be sent directly to the remote server 2 or the information may be used to identify the type of the capsule 7 and transmit the identified type only. Of course, the code and reader can other than a bar coding technology but can be: colour, shape or logo recognition, magnetic, electromagnetic, inductive, conductive or other similar identification technologies.

The beverage production machine 4 furthermore comprises sensors for monitoring internal parameters of the processing mechanism. Such parameters might be the temperature of the liquid that is achieved before the liquid is supplied to the capsule 7, the flow rate of the liquid into the capsule, the pressure at which the liquid is provided or the amount of liquid that is supplied during one cycle of preparation of the beverage. Of course, further internal parameters might be monitored. In the illustrated embodiment two different sensors 13.1 and 13.2 are shown, but it is self-explanatory that there might be as many sensors as necessary in order to monitor all relevant values of the processing mechanism 9. Internal parameters can also be events that are identified by the processing unit 12, for example switching off during use.

The detected values or electric signals corresponding to the detected values are transmitted from the sensors 13.1, 13.2 to the processing unit 12. The processing unit 12 then again transmits the result of the measurement of the sensors 13.1, 13.2 or information on a detected event to the server 2. The result of the measurement may either be the value measured by the sensor 13.1 or 13.2 itself or corresponding information. Furthermore, in order to avoid unnecessary data transferred from the beverage production machine 4 to the server 2, in certain non-limiting embodiments, the values measured by the sensors 13.1 and 13.2 are analyzed in the processing unit 12. Such analysis may for example be a comparison between the measured value and a threshold that is stored in the processing unit 12. Only in case that the value exceeds or falls short of the respective threshold the result of the measurement is transmitted to the server 2. Of course, for some parameters that are monitored it seems desirable in certain non-limiting embodiments to transmit every value that is measured to the server. Alternatively, a time interval may be set and after such time interval has elapsed a parameter is measured and the result thereof is transmitted to the server 2. This gives the opportunity to monitor for example a decrease of performance.

Figure 3:
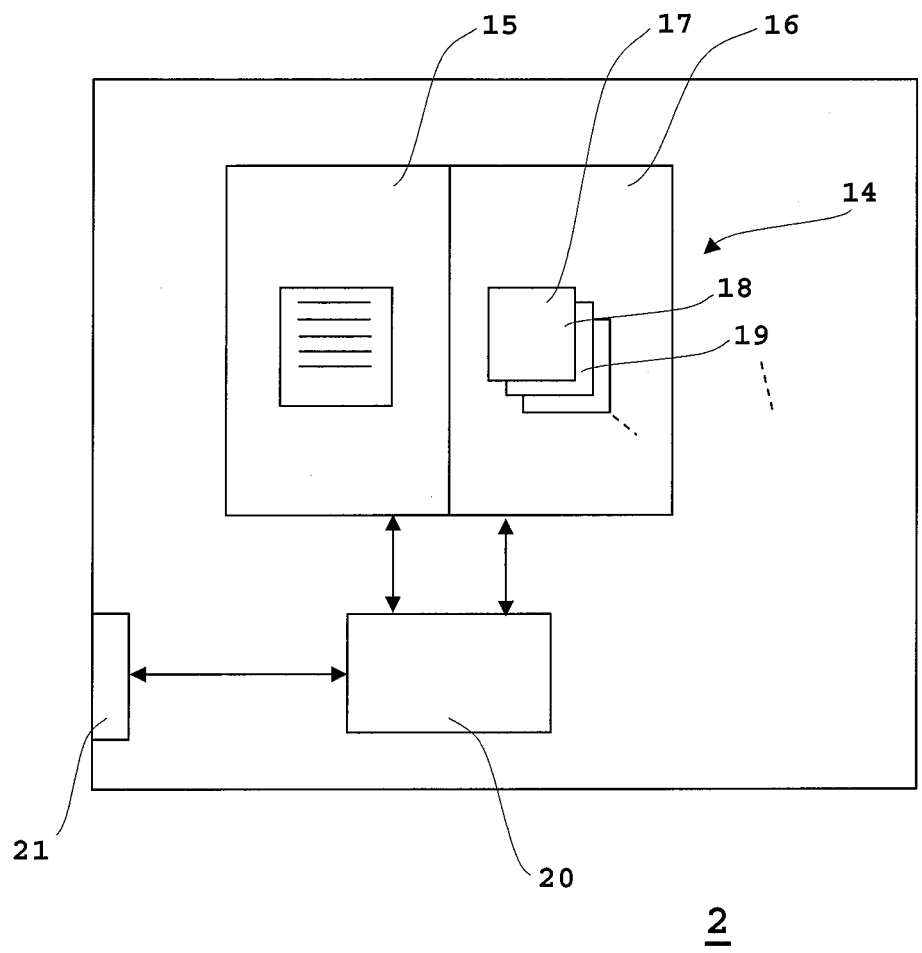
FIG. 3 is a block diagram of a server of the system constructed in accordance with the presently disclosed and/or claimed inventive concept(s).

FIG. 3 shows an example of a server 2 for use in the system and for the inventive method. The server 2 comprises a storage means 14 that is divided into two storage areas 15 and 16. In the first storage area 15 there is stored a table including the information on the different types of capsules 7. In particular, the information includes a definition of the nutritional ingredients that are contained in the capsule 7, the amount of the nutritional ingredient and the respective amount of the infant formula that is produced when using the capsule 7, the flavor of the infant formula and the recommended age of the baby for which consumption of the infant formula made from this particular type of capsule is recommended. In a second storage area 16 there are stored user accounts 17, 18, 19 etc. As it will be explained in the following, these different user accounts 17, 18, 19 all make use of the same table which is stored in the first storage area 15. Thus, an update of the table can be made easily and any recommendation or determination of replenishment is then based on the actual list of products that are available.

The storage means 14 is connected to a processing unit 20. By means of the processing unit 20 the information of the table stored in the first storage area is updated. This information is updated only internally (i.e. by the capsule manufacturer (supplier)) contrary to the user accounts 17 to 19 that may be updated by the users themselves. In order to make such an update to the user profile 17, 18 and 19 the processing unit 20 is connected to an interface 21 by which the server 2 is connected to the internet.

Figure 4:
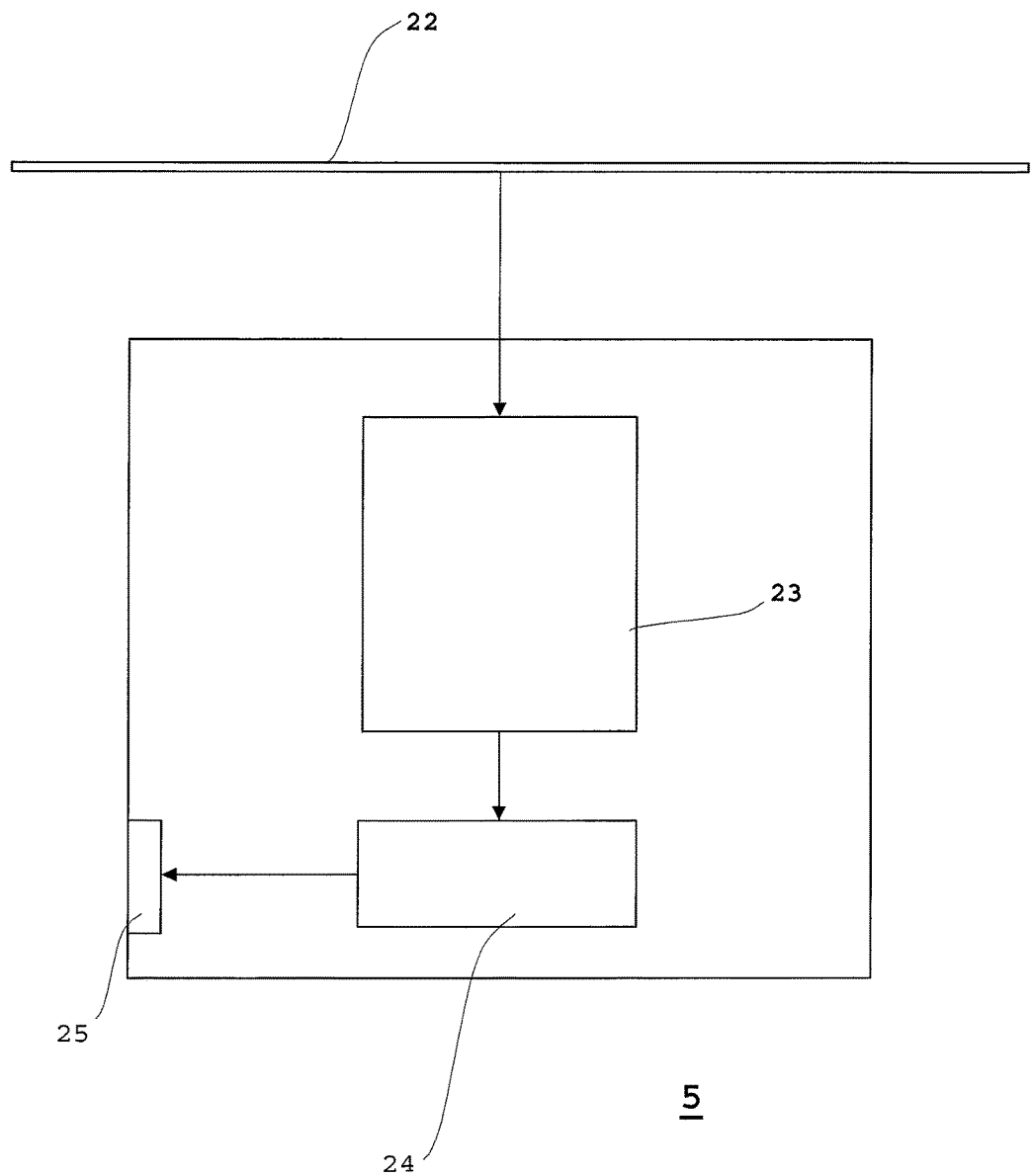
FIG. 4 is a block diagram of another device constructed in accordance with the presently disclosed and/or claimed inventive concept(s).

In FIG. 4 an example for another device 5 being a weight scale is illustrated. The weight scale includes a platform 22 on which the baby to be weighted is placed during measurement. The weight scale comprises a sensor 23 that is connected to a processing unit 24. When a baby is placed on the platform 22 the sensor 23 determines the weight and supplies a respective electronic signal to the processing unit 24. The processing unit 24 analyses the electric signal and transmits the weight of the baby via interface 25 to the server. Again the interface 25, in certain non-limiting embodiments, is capable of performing a WI-FI communication with a router of a home network.

When the processing units 12 or 24 of the beverage production machine 4 or the weight scale 5 transmit information to the server 2, the date and time at which this information was generated is transmitted, in certain non-limiting embodiments, to the server 2 as well. In the case that information is transmitted to the server each time an event occurs like preparing a beverage using a capsule 7 or performing a measurement of the weight of the baby the date and time of the information corresponds to the transmitting time and thus the transmitting time may be used.

Although not illustrated for the weight scale here as well sensors may be included in the weight scale 5 in order to monitor internal parameters of the device 5 and results of such measurements may be transmitted to the server 2 as it was explained in greater detail with respect to the beverage production machine 4. To avoid unnecessary repetition it is referred to the information given above.

Figure 5:
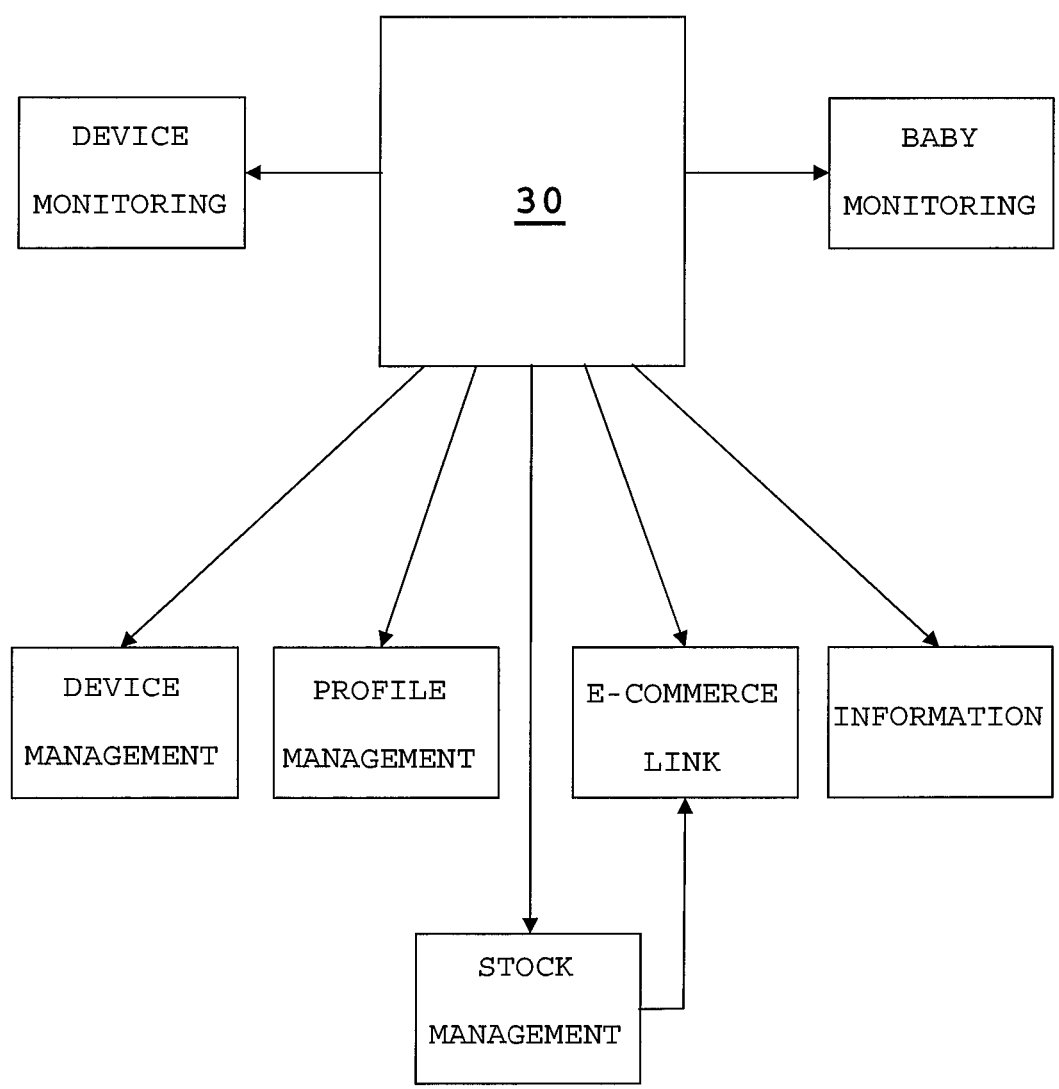
FIG. 5 is an illustration showing the association of the different information collected by the server.

In the following the use of all the information that is collected by the server and which is transmitted by the beverage production machine and/or other devices is explained referring to FIG. 5. When the user connects to the server 2 for the first time he enters the system by a web access and creates his account 30. Each user creates his own account 30 on a website that is presented by the user terminal 6. When the user creates his account 30 at first he enters information regarding the account holder like name, address, telephone number and the like. Furthermore he might include information regarding the desired payment mode in case that he would like to use the possibility of purchasing items and/or capsules via e-commerce or an internet shop.

After such user account 30 was created the user (account holder) may add one or more profiles of babies which are persons that consume the beverages produced by the beverage production machine 4. Besides information like the baby being male or female and for example the given name it is particularly important that an information is entered on the basis of which the current age of the baby maybe determined. Of course, in certain non-limiting embodiments, the date of birth is entered into the system. Furthermore the profile can include information on allergies which might also be taken in consideration when a type of capsule is determined for replenishment.

In the user account 30 there may also be stored a plurality of user preferences. For example the account holder may select that he only would like to use the monitoring functions only (also explained later in detail) or that he would like to perform an automatic order when replenishment of the capsules 7 is needed or he would like to receive a notification that replenishment is needed. In the latter case he has the opportunity to decide by himself when an order is sent to the supplier.

After setting up the user account the user can register his beverage production machine 4 (or a plurality) and/or other devices 5 that shall be included in his home network to his account. Each of the beverage production machines 4 and the other devices has an exclusive MAC address which is used for registration and identification of any information that is sent to the server 2 so that any information and registration can be assigned to the correct user account. At first it is therefore necessary to integrate the beverage production machine 4 or the other device 5 to the user account. In order to do so at first the machine is switched on and is brought into a connection mode, for example the Wi-Fi mode. After that when the beverage production machine 4 or the other device 5 is prepared the user terminal is brought into its searching mode in order to look for Wi-Fi networks. The beverage production machine or the other device that is to be integrated into the system is then identified as own Wi-Fi network and is selected. After doing so the routine for further integrating the machine into the system is available on the homepage of the provider of the system.

When the beverage production machine 4 is integrated into the system it is connected to the server 2 at any time the home network is established. When being connected it is possible for the beverage production machine 4 (or any further registered device 5) to send information to server 2. All registered machines or devices of a user are assigned to his account. Consequently a device monitoring is possible on the basis of any information, internal and external parameters that are submitted from the machine or device to the server 2. On the other hand and on the basis of the information stored in the server 2 about the date of birth of the baby monitoring of the baby's development is possible. For example weight curves may be built and may easily be monitored with respect to an unusual development of the baby. In case an unusual development is detected an alert may be sent to the account holder. This may be done by an automatic email so that it is not necessary that the account holder actively logs in. For producing such weight curves the measurement results and date and time of measurement of the weight scale 5 are used. New devices that may be purchased at a later time may be included into the system in the same way as it was explained above and thus a device management for all registered devices 5/beverage production machines 4 is possible via the web access.

Furthermore account management is possible which means that the account holder may alter his personal data, add for example another baby profile with its personal data like date of birth, sex and name. General information for parents may also be given, for example information about a balanced diet, about status of the development of a baby, an average development of the weight and/or other growth related parameters over time.

Besides all these possibilities that are available for a user the central aspect is stock management for the capsules 7. As it was explained above the system has the information that a capsule of a particular type was used at a corresponding date and time. Thus, the number of capsules 7 that are still in stock of the user is decreased by one. When any use of the capsule 7 is recognized by the beverage production machine 4 and the respective information is transmitted to the server 2 and stored within the user account 30 an actual number of the remaining capsules 7 is always available. In certain non-limiting embodiments, purchasing the capsules 7 is only possible using the user account 30, so that any purchase of capsules 7 will automatically update the number of capsules 7 that are in stock of the user.

In case that other sales channels are also available, the user has the opportunity to enter a current status of his stock manually.

In case that the number of remaining capsules 7 falls under a threshold that might be set by user input the processing unit 20 of the server 2 identifies the demand for replenishment of capsules 7. Such a demand may either be communicated to the account holder or results in an automatic ordering procedure using an e-commerce link or link to an internet shop that is available through the same account 30 of the user. This e-commerce link is also directly accessible by the user in order to purchase for example further devices 5 like the weight scale.

Figure 6:
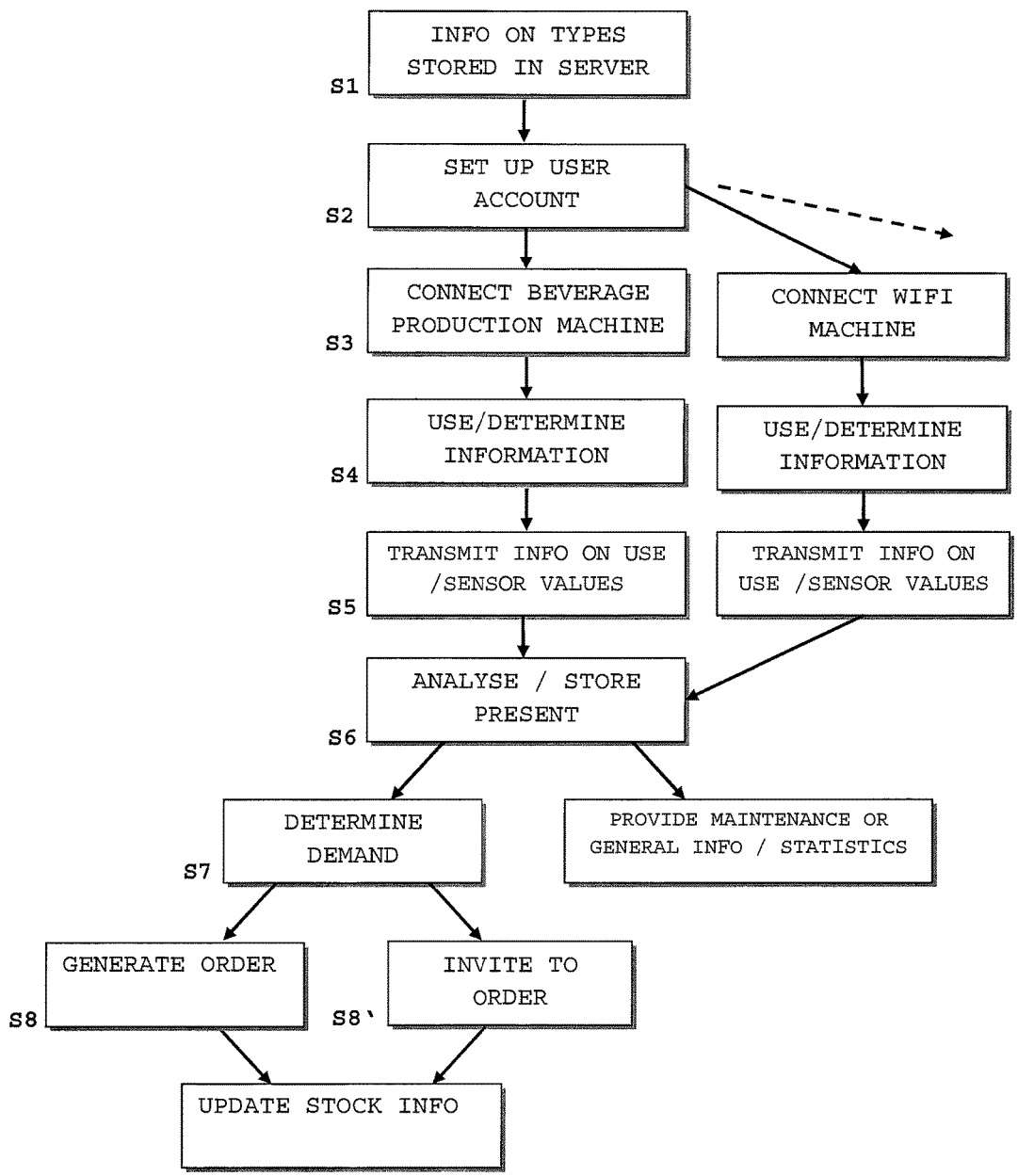
FIG. 6 is a simplified flow chart illustrating the method steps of the presently disclosed and/or claimed inventive concept(s).

In FIG. 6 a flow chart of the method according to the presently disclosed and/or claimed inventive concept(s) is shown. At first information of the different types of capsules 7 that are available are stored in a first storage area 15 of the storage means 14 of server 2. Then a user account 30 is setup on the server in S2 including data of the account holder as well as the relevant data of at least one baby in a profile. After that in step S3 the beverage production machine 4 and/or the other device 5 is integrated into the system. For doing so the MAC address of the machine/device is registered in the user account 30 and a connection between the machine/device and the server 2 is established.

When such communication between the server 2 and the beverage production machine 4 or the other device 5 is possible these devices or machines may be used. During use and as it has been explained earlier information may be sent from the beverage production machine 4 or the other device 5 to the server. This information can be information about the type of used capsules 7 that was used together with date and time or information on an internal parameter including events that was detected inside the beverage production machine 4 or the weight scale as other device 7 or it may be the result of a measurement or an information according to such measurement that is transmitted for example by the weight scale. The transmission of such information is performed in step S5.

Inside the server 2 the processing unit 20 analyzes and/or stores the received data. Such analysis may for example be a comparison between the number of capsules 7 still in stock and a threshold that is predetermined. If it is determined by the analysis instep S6 that the remaining number of capsules 7 falls under a certain threshold the demand of capsules 7 is determined in S7. In order to determine the demand it is referred to the age of the baby and maybe other information of the baby's profile and the table stored in the first storage area 14. The demand may also be determined using a predictive consumption schedule which is determined on the past consumption of the baby and its age with or without pondering factors such as its health, weight or other growth or heath factors or specific pediatrician inputs. On the basis at least of the age it is then determined which types of capsules are reasonable to be purchased since these types of capsules 7 will be obviously used in the near future and should therefore match the current age of the baby. In case that there is a plurality of types of capsules, for example having different flavors, recommended for the same age the demand for the different types that are recommended for the same age may be for example equally distributed over the different flavors available. When an allergy of the baby is stored in the profile corresponding types of capsules are omitted when the replenishment information is generated.

Thus finally the determined demand includes information about a number of a particular type of capsules 7 (or a plurality of types) that need to be ordered as a replenishment. The replenishment may include a plurality of different types of capsules 7. After such demand has been identified and thus the replenishment is determined an order may be generated automatically as indicated in step S8 according to respective settings in the user preferences. Alternatively the account holder may receive a notification that an order is necessary for replenishment. This notification includes an information about the determined replenishment such that the account holder in the end may for example only confirm and by confirming the determined replenishment an order will then automatically be issued.

The user may set up preferences in his account and in these preferences it is identified if an automatic ordering routine or a notification shall be issued.

Assumed that after step S8 or S8' the ordered amount of capsules was delivered the stock information is updated so that for the next analysis in step S6 the real number of currently in stock capsules 7 is available.

In step S10 maintenance information and/or statistics are be provided. As a result of the analysis for example the history of the consumption may be presented by the account holder. Furthermore necessary maintenance of the beverage production machine 4 or the other device 5 may be provided.

Examples of the information that is provided are given in FIGS. 7, 8, 9, 10, 11a, 11b.

Figure 7:
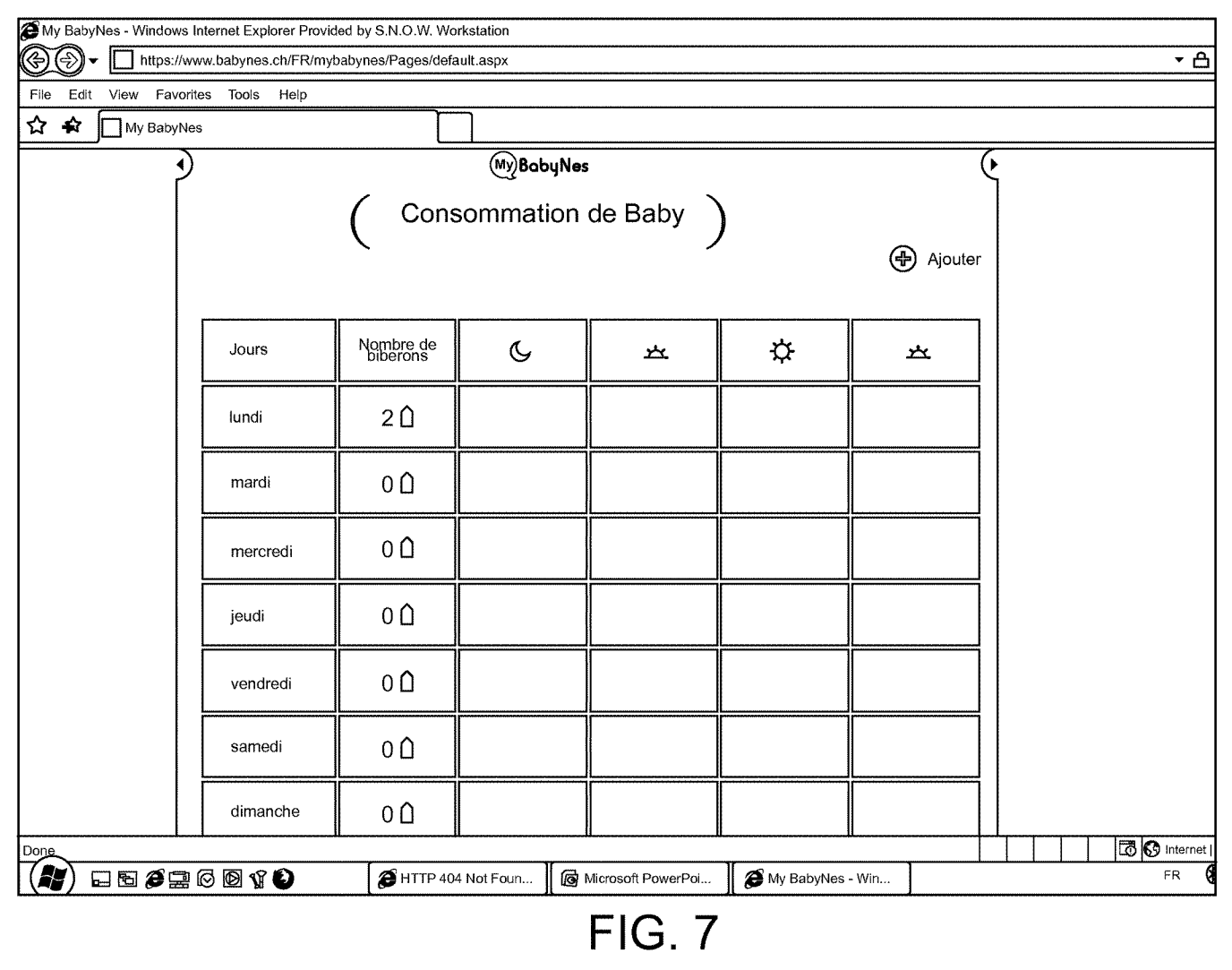

After the user logged into his account on the website it is possible for him to visualize the consumption as shown in FIG. 7. Based on the information of the identified capsules 7 that is received by the server 2 and furthermore using the date and time also transmitted with the identification information a calendar is generated in which the number of meals is shown. In the illustrated embodiment the calendar is limited to one week, each day corresponding to one row. Separate columns are displayed for showing the exact time at which the infant formula was prepared. Columns are presented for night, morning, afternoon and evening. The calendar is presented upon operation of the respective link in a home menu of the account 30. Different time periods instead of week may be set for displaying the consumption.

Within the calendar there may be presented a warning if an abnormal consumption is determined. For example if for a particular day the recommended amount of infant formula could not be reached this day could be marked up in a different color.

Figure 8:
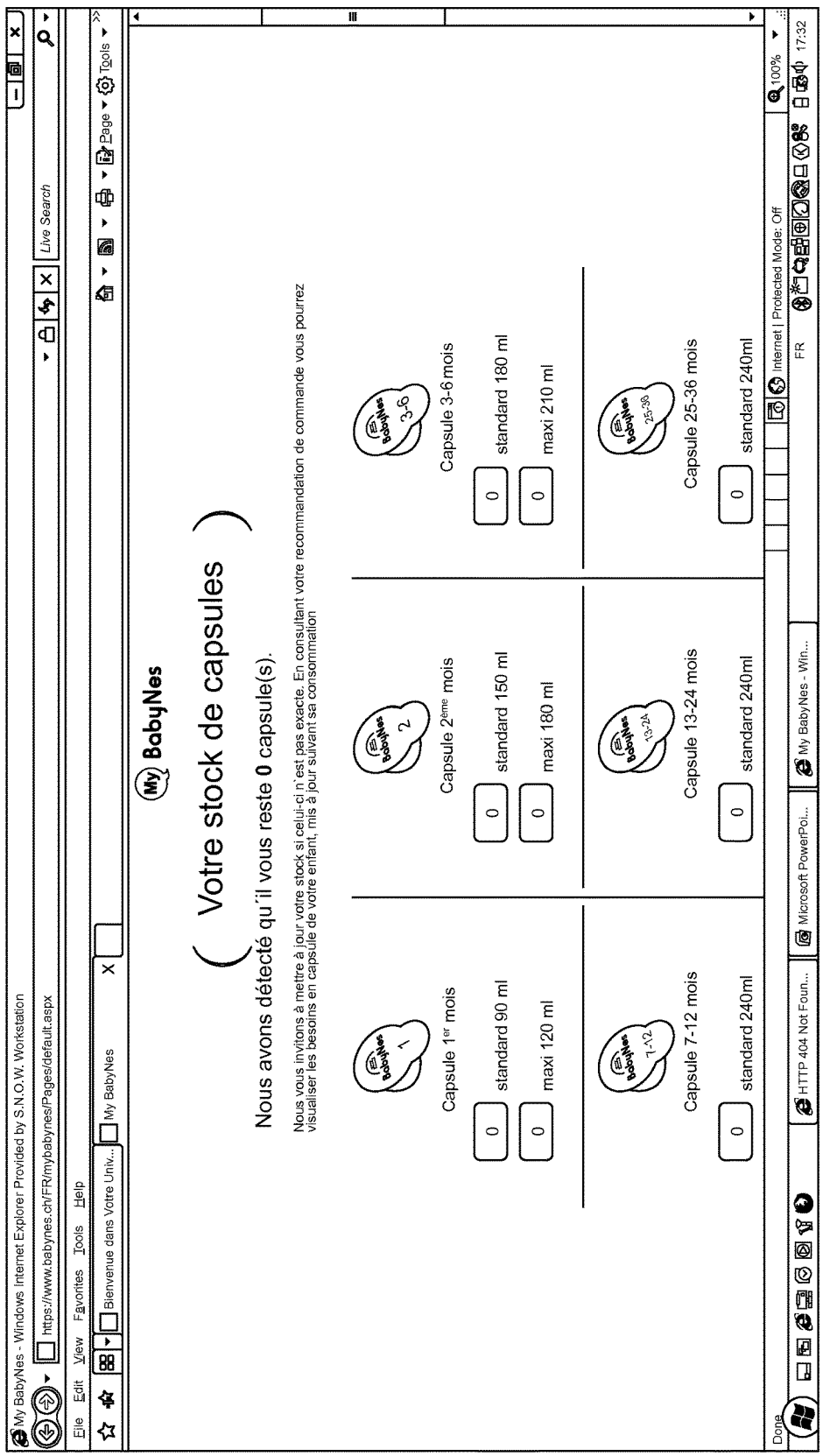
FIG. 8 is an overview over the current status of the stock.

FIG. 8 shows an example for information that is displayed regarding the current stock standing. As it can be seen the information display is divided into a plurality of areas. In each area capsules that are recommended for a particular age are displayed. The illustrated embodiment shows that for each age there are suggested two different types of infant formula depending on the size intended for one nutritional liquid intake. Of course it may be considered that not only the size results in a different type of capsule but also different ingredients.

For each type of capsules 7 there is given the current number in stock. In the presented illustration there are no more capsules 7 remaining and thus purchasing of capsules 7 is needed. In order to perform such purchase of capsules 7 a direct link is provided that leads to an e-commerce platform for purchasing capsules 7 using the data of the account 30 for payment.

Figure 9:
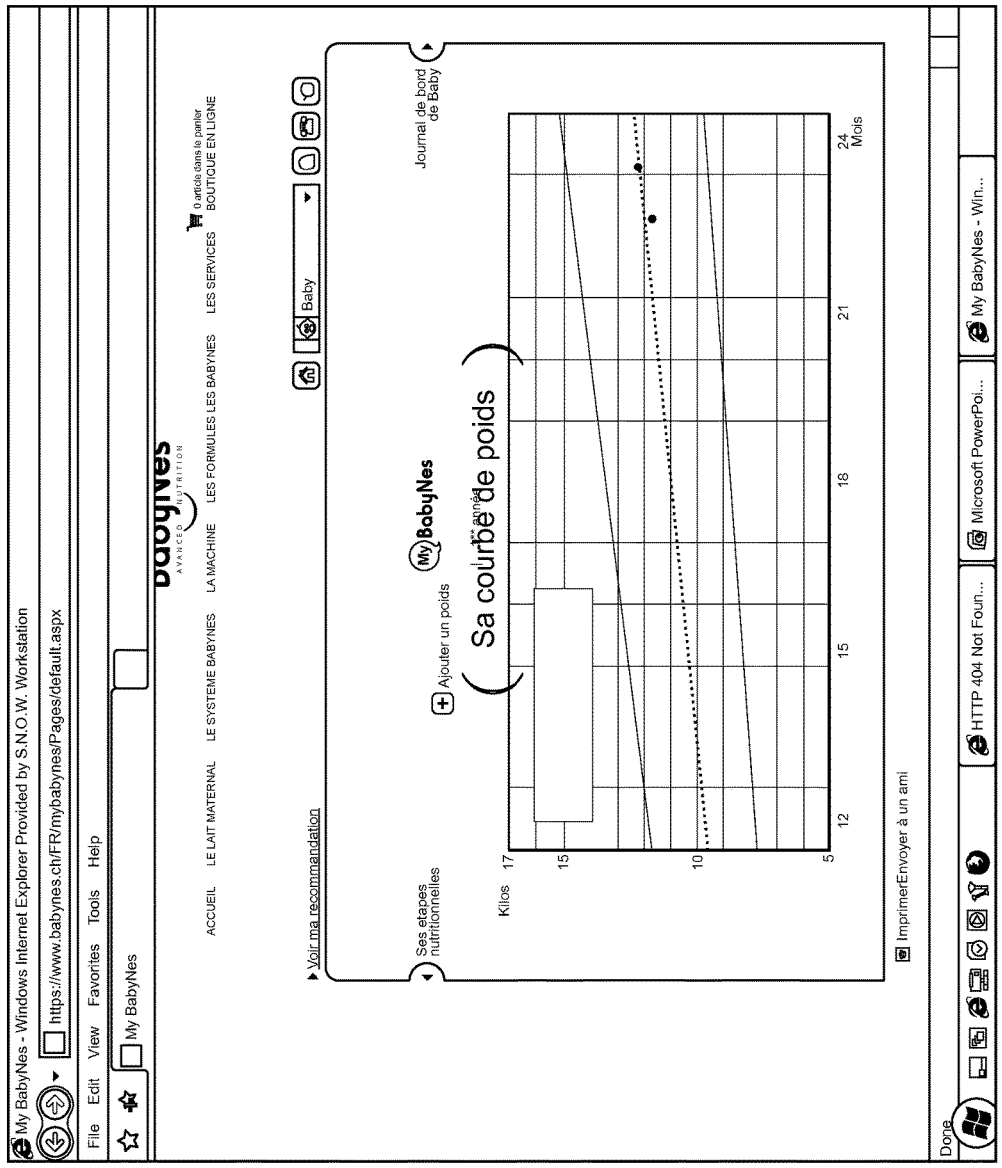
FIG. 9 is a weight curve.

FIG. 9 shows another example for an analysis that results from the information received from other devices, in the present example a weight scale. On the basis of the weight scale the development of the weight of the baby is shown. In particular two measurements can be seen that are presented relative to an average development of weight. The analysis of the information on the external parameter "weight" of course also makes use of the baby profile of the user account 30. In particular the date of birth is used to determine the age at the time point of measurement in order to reasonably display the measured value in the diagram. As it was illustrated in FIG. 5 from the user account 30 baby monitoring is accessible. Starting from the user account 30 at first the respective function "baby monitoring" is accessed and from there it is possible to select either the consumption analysis or the weight analysis. Accessing the respective display pages is then possible by using commonly known hyperlinks.

Figure 10:
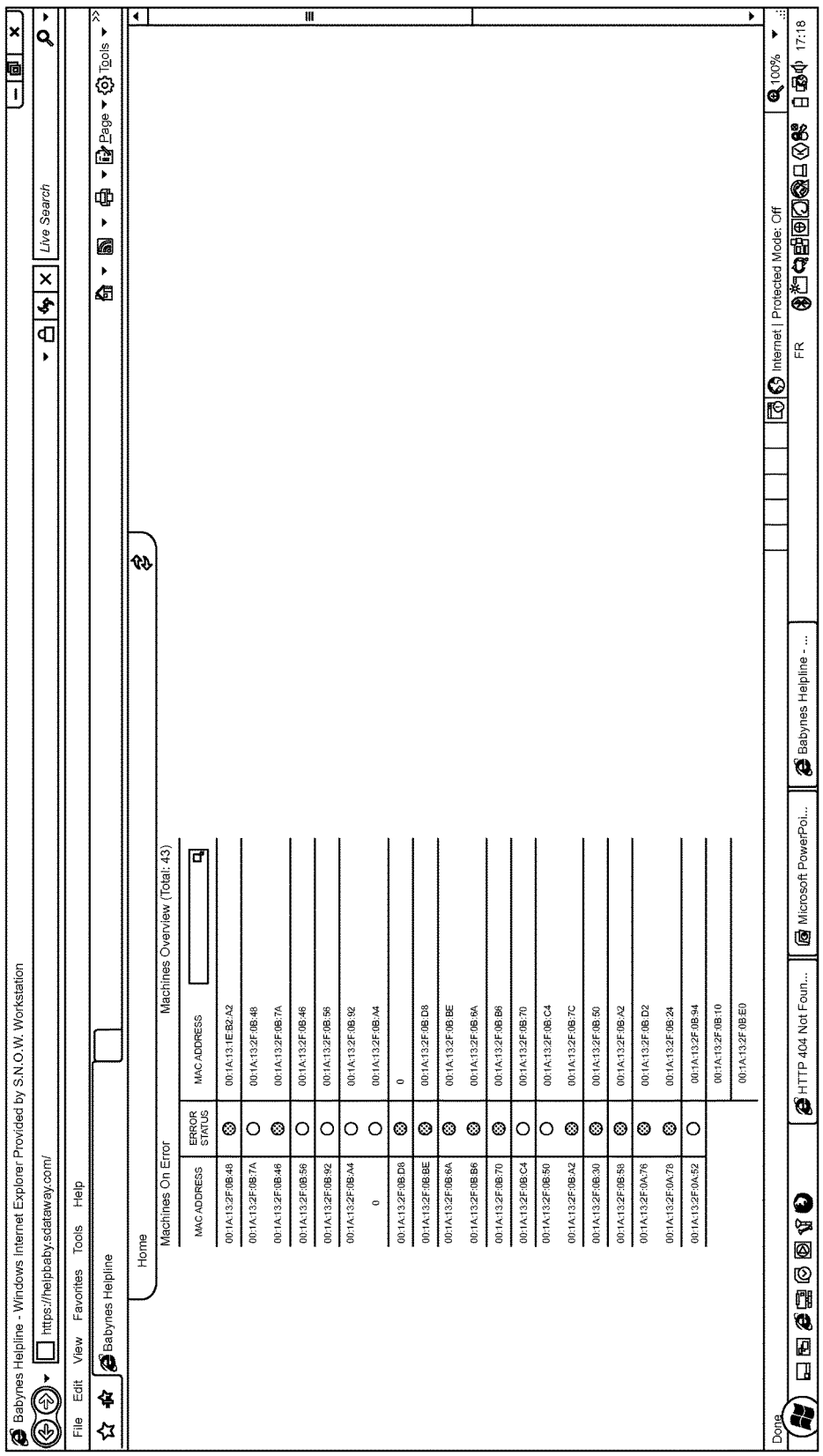
FIG. 10 is an overview over errors and the entirety of registered devices.

In addition to the baby monitoring also device monitoring is possible as already explained with respect to FIG. 3. FIG. 10 shows an overview that is given when a device monitoring area of the system is entered. When entering a first dashboard from the user account 30, an overview over all beverage production machines 4 and other devices that are registered and assigned to a user account 30 is given. The user account is typically an operator account made available to an operator who monitors a park of beverage production machines. In the overview two major types of information are given. On the one side the MAC address of any machine that encountered an error is listed. The error status is indicated by a sign which allows determining the relevance of the encountered error.

Figure 11A:
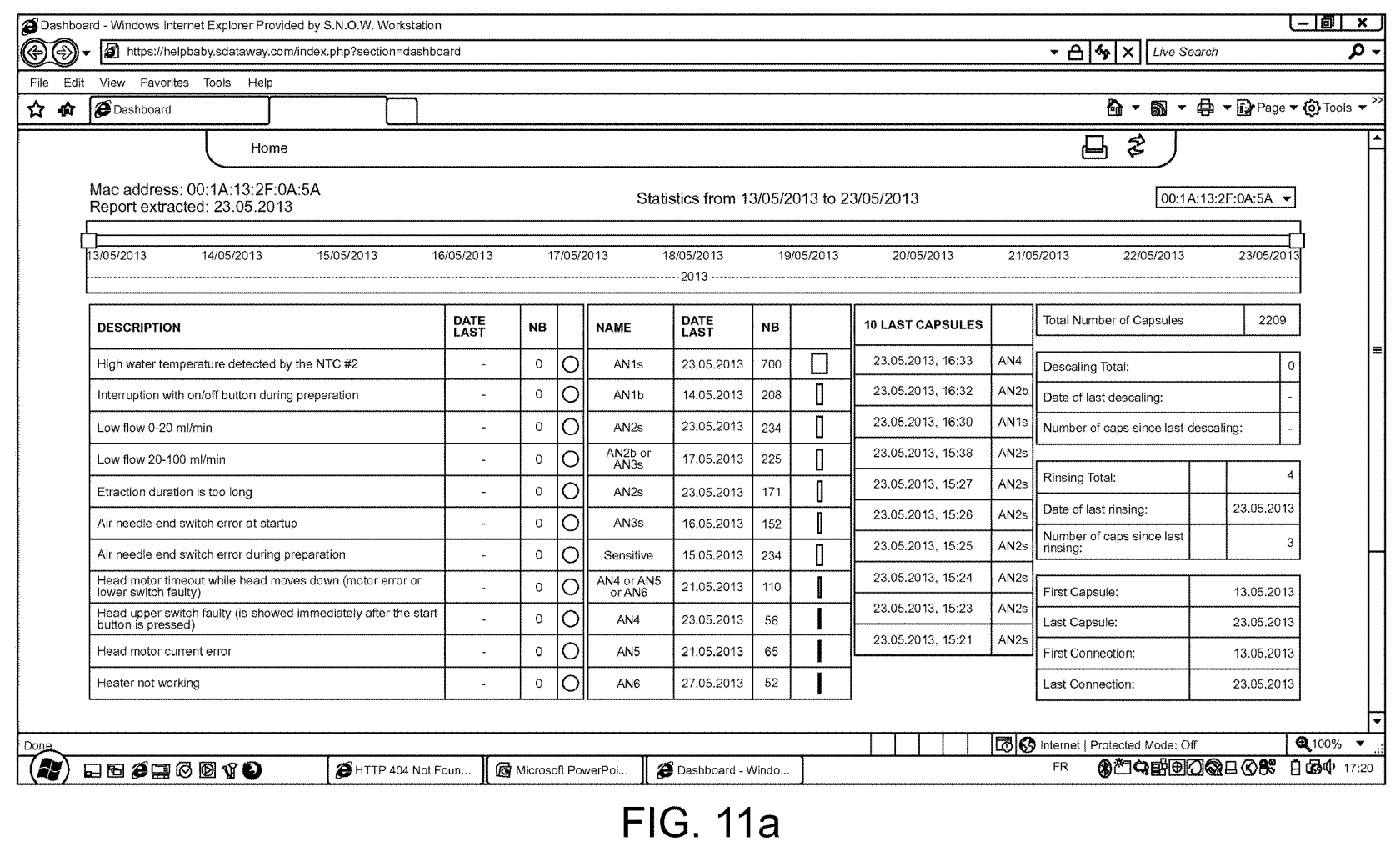
Figure 11B:
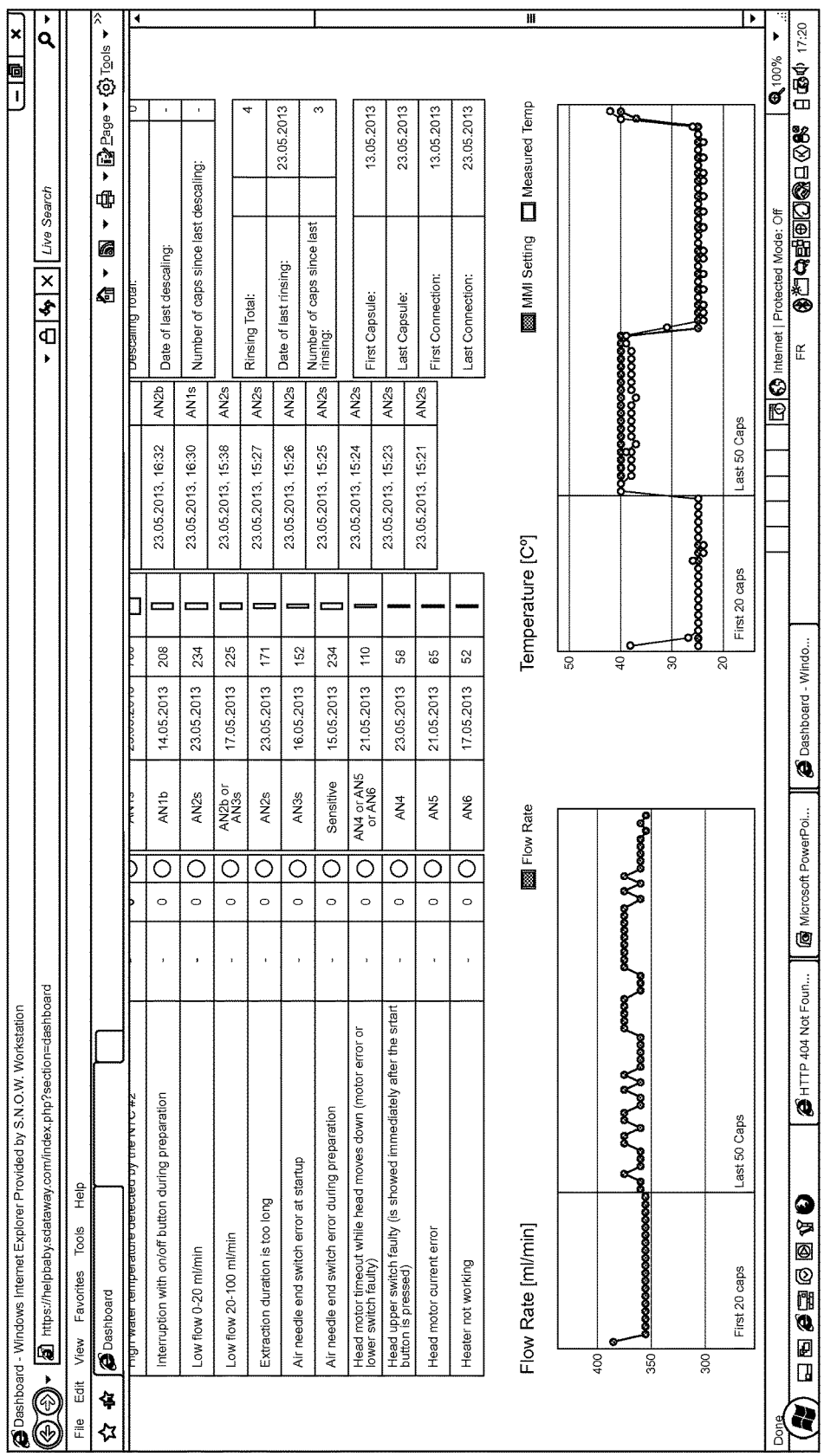

In addition to that the MAC addresses of all the machines that are registered in the user account are listed. The listed MAC addresses are linked to a detailed view for the respective machine or device and which is shown in FIGS. 11a and 11b.

In FIG. 11a there are listed a number of examples of events that are monitored and information on the events that is transmitted to the server 2. "Event" in the context of device monitoring is also referred to as internal parameter. For example in the first line of the table there is an entry "high water temperature detected by NTC #2. This is an example for information based on a measured internal parameter that is transmitted to the server 2 although due to an internal monitoring routine of the beverage production machine 4 already avoided a malfunction of the system. For example the temperature sensor NTC #2 is arranged in the waterline downstream of a thermal block of the processing mechanism 9 of the beverage production machine 4. It thus is present to monitor the temperature of the water that is finally used for the preparation of the infant formula. The temperature there should be for example 35 to 41° C. If it is recognized that the temperature lies above this temperature interval the preparation of the infant formula is stopped by the machine itself. Nevertheless the event or error is reported by transmitting a respective information to the server 2.

In the next line an event where the user interrupted the preparation of an infant formula was recognized. Such interruption may be usually the result of an incorrect use of the machine and may be monitored also as an internal parameter that is determined by the processing unit 20.

In the next line as an internal parameter the flow rate was measured to fall below 20 ml/min. In that case it is most likely that the filter is clogged. In order to distinguish between the filter being clogged and the machine being scaled there are a plurality of thresholds that cause different entries into the list. Although measured by the same sensor it can therefore be distinguished between a clogged filter and the machine being scaled. In the present example an interval from 20 ml/min to 100 ml/min still lying below the regular flow rate indicates the machine being scaled.

Furthermore other internal parameters of the machine may be monitored and checked before preparation of the beverage is started. For example an air needle which is used to increase the air pressure in the capsule 7 after preparation in order to empty the capsule 7 is checked in respect of its function. The air needle needs to be moved during the preparation of the beverage and thus as a sensor for an internal parameter there is provided an end switch for detecting the correct movement of the air needle.

Furthermore an entry may be made if the end switch detects during preparation of the beverage that the end position of the air needle could not be achieved. Thus, again to different events may be recognized on the basis of the same sensor in the beverage production machine 4.

When preparing the beverage head of the processing mechanism 9 is moved onto the capsule that is located in a capsule holder. This movement may also be controlled for example by using an end switch or a position sensor. In case that within a predetermined time the end position of the head cannot be achieved, information regarding the elapsed time may be sent to the server 2 and an entry in the list shown in FIG. 11a is generated. As it has been described earlier, instead of the measured time that was needed for lowering the head onto the capsule 7 also only a result of an analysis may be transmitted to the server 2. In the present case this is the excess of the time limit when moving the head.

In addition to the time that is needed for closing the head against the capsule 7 it can also be detected if closing the head against the capsule or holder is not possible at all.

The head is moved by a motor and the current driving the motor may also be monitored. When the system has a defect which causes an abnormal current peak such a failure can also be detected. An increase of the current maybe caused by a damaged mechanism of the head which then results in improperly closing or not closing at all the head against the capsule 7.

As a last example and shown in the last line of the detailed view of FIG. 11a it was detected that the heater is not working at all which means that heating up the liquid is impossible. This can also be detected for example by the temperature detector NTC #2 or another NTC-type temperature detector associated to the heater (e.g., a thermo-block or on-demand cartridge heater) or by sensing the current that is used for driving the heater.

In the lower part of FIG. 11b other statistics that result from the internal parameters that are detected information on the internal parameters that are transmitted to the server 2 are illustrated in diagrams. On the left side the flow rate for producing a beverage from a capsule is shown in the diagram. As the total number of capsules 7 that are used by the machine may be very large it may be desired (but non-limiting) that only values measured for the first few capsules 7 are shown and separated by a line measured values for the last capsules 7 are shown. In the present case it can be seen that for the first 20 capsules 7 a very stable value could be achieved while for the last fifty capsules 7 a greater range of the flow rate occurred. A similar diagram is shown for the temperature which is on the right side. Again the measured values are shown for the first 20 capsules 7 and for the last 50 capsules 7. It is to be noted that not only the measured temperatures but also the set values are illustrated in the same diagram and thus the deviation of the setting and the measured temperature may easily be recognized.

Furthermore and shown on the right side of the displayed window above the temperature diagram other events and statistics as the total number of capsules, the number of descaling procedures, the date of the last descaling, the number of cups since the last descaling are shown. The same is given for the rinsing procedure. In addition to that statistics on the used types of capsules 7 are also given. Each type of capsule 7 that was used is listed like for example AN 1a, AN 1b, AN 2s, . . . as shown in the column "name". For each of these types of capsules 7 the date of the last use of this respective type is given and additionally the total number of capsules 7 of this type. This total number of capsules 7 is not only given as a numerical value but also as a scale. As this listing is sorted on the basis of the number of capsules 7 per type it is difficult to evaluate which of these capsules 7 were in fact the last ones that were used. In order to have an overview of the last capsules 7 used in the machine, another table is shown indicating the last 10 capsules 7 that have been used. Thus, even if the same type of capsules 7 was used a plurality of times for the last 10 cycles it can be recognized at which point of time the respective type of capsule 7 was used.

Figure 12:
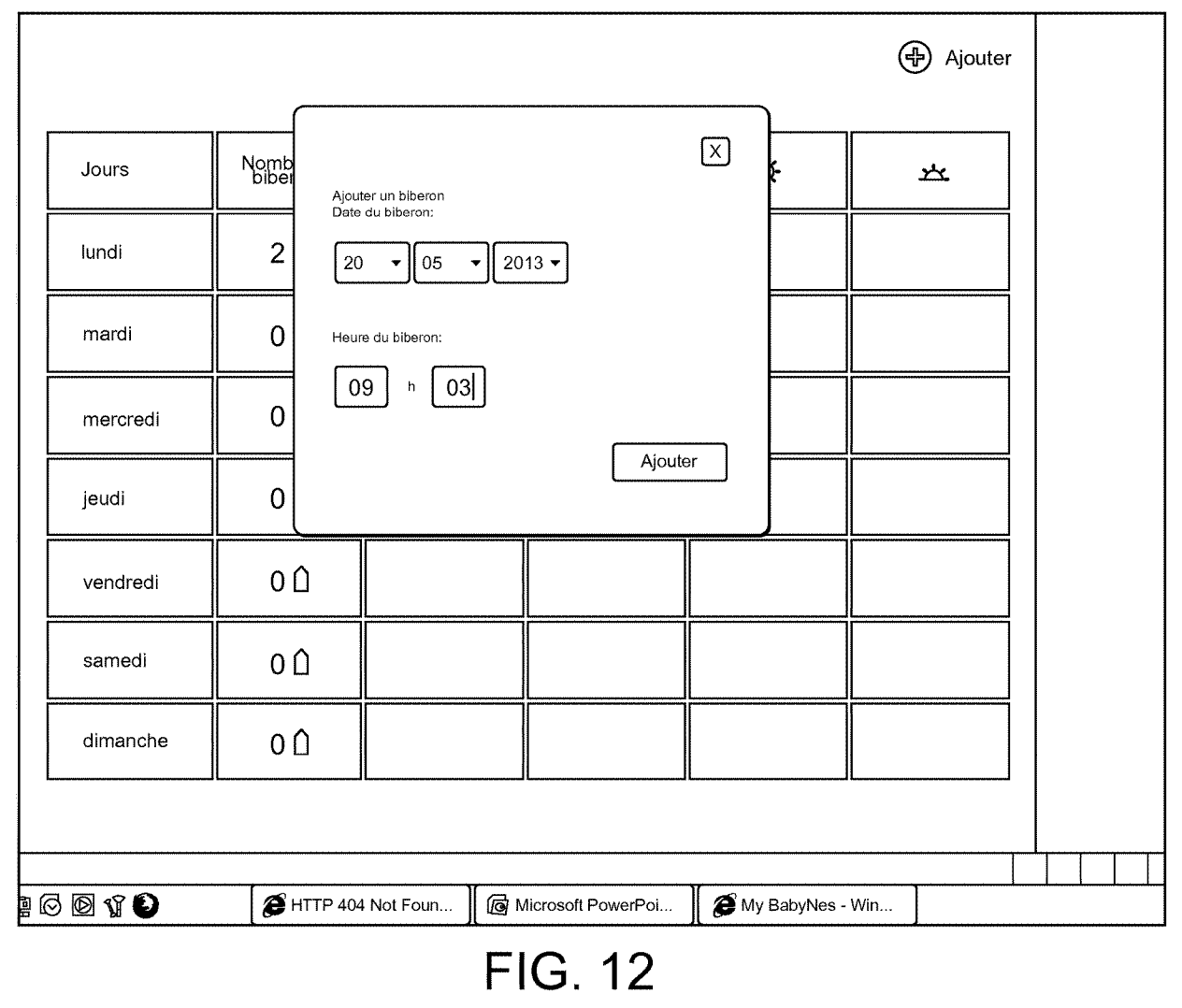

In some cases it may occur that not every time the baby is fed the respective information is transmitted to the server 2. This may for example be the case when a family is on holiday or the like. Nevertheless it is of course desirable that the statistics do show any meal the baby had and therefore it is possible to enter additional meals of the baby manually. A mask is provided which allows entry of data corresponding to the information regarding the type of capsule usually transmitted by the beverage production machine 4. An example of which mask is given in FIG. 12.

The same is possible for example adding a weight measurement of the baby manually. In case that the weight was not measured using the weight scale integrated into the system it is then nevertheless possible to include the measured value into the statistics and in particular into the weight curve.

It is furthermore possible that not only the user is capable of accessing the data that are stored under his user account but that these data is also supplied to the pediatric for example when it has immediately a weight curve available for his diagnostics.

Furthermore it is to be noted that instead of browsing a web site provided by the server it is also possible to use an app providing the same functionality and running on an iOs, android or the other operating system of a smart phone.

The invention claimed is:

1. A system for determining replenishment information for capsules, comprising:
an infant formula production machine including means for producing an infant formula from a capsule and identifying a type of the capsule from a plurality of capsules and means for transmitting information to a remote server;
the remote server including storage means for storing a user profile including personal information about an infant consuming infant formula produced from a capsule including information suitable for determining the age of the infant and capsule information for a plurality of types of capsules, wherein the user profile is updatable by a user terminal connected to the server via internet; and
means for determining at least one type of capsule as replenishment on the basis of the capsule information, the identified capsules, and the age of the infant as determined by the personal information.

2. The system according to claim 1, wherein the infant formula production machine and/or at least one other device comprise at least one sensor for determining an internal parameter, and are configured to transmit information on the internal parameter to the server.

3. The system according to claim 2, wherein the server is configured to store the received information.

4. The system according to claim 1, wherein the at least one other device is configured to measure an external parameter and to transmit the result to the server.

5. The system according to claim 3, wherein the server is configured to analyze the internal parameter and/or the external parameter and/or the consumption.

* * * * *